(12) United States Patent
Kubo et al.

(10) Patent No.: US 10,529,497 B2
(45) Date of Patent: Jan. 7, 2020

(54) STEREOSTRUCTURE

(71) Applicant: JAPAN CAPACITOR INDUSTRIAL CO., LTD., Fussa-shi, Tokyo (JP)

(72) Inventors: Hiroshi Kubo, Fussa (JP); Nami Kanaya, Fussa (JP)

(73) Assignee: JAPAN CAPACITOR INDUSTRIAL CO., LTD., Fussa-shi (JP)

( * ) Notice: Subject to any disclaimer, the term of this patent is extended or adjusted under 35 U.S.C. 154(b) by 227 days.

(21) Appl. No.: 15/549,317

(22) PCT Filed: Sep. 16, 2016

(86) PCT No.: PCT/JP2016/077596
§ 371 (c)(1),
(2) Date: Aug. 7, 2017

(87) PCT Pub. No.: WO2018/051522
PCT Pub. Date: Mar. 22, 2018

(65) Prior Publication Data
US 2018/0277308 A1    Sep. 27, 2018

(51) Int. Cl.
*B32B 7/02* (2019.01)
*H01G 9/048* (2006.01)
*H01G 9/008* (2006.01)

(52) U.S. Cl.
CPC ............. *H01G 9/048* (2013.01); *H01G 9/008* (2013.01)

(58) Field of Classification Search
CPC ........... B01J 32/00; B01J 35/02; H01G 9/008; H01G 9/042; H01G 9/045; H01G 9/048; H01G 9/055; H01G 9/15
See application file for complete search history.

(56) References Cited

U.S. PATENT DOCUMENTS

| 2,461,410 A | 2/1949 | Clark |
| 6,038,124 A | 3/2000 | Uchi et al. |
| 2008/0005878 A1 | 1/2008 | Merker et al. |
| 2009/0021892 A1 | 1/2009 | Katano et al. |
| 2012/0099242 A1 | 4/2012 | Ohyama et al. |
| 2012/0245024 A1 | 9/2012 | Chaput et al. |
| 2015/0228413 A1 | 8/2015 | Choi et al. |

FOREIGN PATENT DOCUMENTS

| EP | 2897143 A1 | 7/2015 |
| JP | S57-106112 A | 7/1982 |
| JP | S61-278124 A | 12/1986 |
| JP | S62-102515 A | 5/1987 |
| JP | H10-189398 A | 7/1998 |
| JP | 2001-257132 A | 9/2001 |
| JP | 2001-291646 A | 10/2001 |

(Continued)

OTHER PUBLICATIONS

Nov. 29, 2016 International Search Report issued in Patent Application No. PCT/JP2016/077596.

(Continued)

*Primary Examiner* — Lawrence D Ferguson
(74) *Attorney, Agent, or Firm* — Oliff PLC (57) ABSTRACT

A stereostructure includes a core portion, and a porous portion located around the core portion. The porous portion located inside a position which is inside from an outer edge of the porous portion by 3/20 of a diameter of the stereostructure in an arbitrary cross section of the stereostructure has a void ratio per unit area of less than or equal to 80%.

7 Claims, 6 Drawing Sheets

(56) References Cited

FOREIGN PATENT DOCUMENTS

| | | |
|---|---|---|
| JP | 2004-351381 A | 12/2004 |
| JP | 2008-177199 A | 7/2008 |
| JP | 2008-177200 A | 7/2008 |
| JP | 2010-171601 A | 8/2010 |
| JP | 2011-204729 A | 10/2011 |
| JP | 2012-161718 A | 8/2012 |
| JP | 2012-193420 A | 10/2012 |
| JP | 2012-200727 A | 10/2012 |
| JP | 2013-00909 A | 1/2013 |
| JP | 2013-009009 A | 1/2013 |
| JP | 2013-157392 A | 8/2013 |
| JP | 2014-022707 A | 2/2014 |
| JP | 2015-073015 A | 4/2015 |
| JP | 2015-521245 A | 7/2015 |
| WO | 2006/027767 A1 | 3/2006 |
| WO | 2010/125778 A1 | 11/2010 |
| WO | 2013/160678 A2 | 10/2013 |

OTHER PUBLICATIONS

Aug. 22, 2019 Office Action issued in European Patent Application No. 16916302.9.

STEREOSTRUCTURE

TECHNICAL FIELD

The present invention relates to a stereostructure, and in particular to a stereostructure capable of carrying a functional material such as a solid electrolyte or a catalyst.

BACKGROUND ART

A stereostructure can be used for an anode body of an electrolytic capacitor, a catalyst carrier, or the like. The application of the stereostructure is not limited thereto, and can be applied to various applications.

Examples of prior art documents disclosing an anode body which carries a solid electrolyte include Japanese Patent Laying-Open No. 2008-177199 (PTD 1), Japanese Patent Laying-Open No. 2008-177200 (PTD 2), and Japanese Patent Laying-Open No. 61-278124 (PTD 3). A solid electrolytic capacitor described in each of PTD 1, PTD 2, and PTD 3 uses an aluminum wire having a surface roughened by etching, as the anode body.

Examples of prior art documents disclosing a catalyst carrier which carries a catalyst include Japanese Patent Laying-Open No. 2012-161718 (PTD 4). The catalyst carrier described in PTD 4 is composed of an aluminum wire provided with a sponge structural layer by etching or the like.

CITATION LIST

Patent Document

PTD 1: Japanese Patent Laying-Open No. 2008-177199
PTD 2: Japanese Patent Laying-Open No. 2008-177200
PTD 3: Japanese Patent Laying-Open No. 61-278124
PTD 4: Japanese Patent Laying-Open No. 2012-161718

SUMMARY OF INVENTION

Technical Problem

In order to cause a stereostructure to carry a functional material such as a solid electrolyte or a catalyst in a larger amount, it is preferable that the stereostructure includes many voids, and has a high surface expansion ratio corresponding to the surface area thereof. The stereostructure having a high surface expansion ratio is also preferable to increase the contact surface between an electrolytic solution and the stereostructure. However, when the stereostructure includes too many voids, it becomes difficult to maintain the mechanical strength of the stereostructure at a portion where voids exist.

In particular, when voids are formed in order from an outer peripheral portion toward a central portion of the stereostructure by etching, more voids are formed with approaching the central portion of the stereostructure, and a portion where voids are formed excessively may have an insufficient mechanical strength. Further, in the portion where voids are formed excessively, voids are connected with each other and large voids are formed, and it has been difficult to obtain a high surface expansion ratio.

The present invention has been made in view of the aforementioned problem, and an object of the present invention is to provide a stereostructure capable of obtaining a high surface expansion ratio while securing a mechanical strength.

Solution to Problem

A stereostructure in accordance with the present invention is a stereostructure containing a conductive material. The stereostructure includes a core portion, and a porous portion located around the core portion. The porous portion located inside a position which is inside from an outer edge of the porous portion by 3/20 of a diameter of the stereostructure in an arbitrary cross section of the stereostructure has a void ratio per unit area of less than or equal to 80%.

In one embodiment of the present invention, when a region between a first virtual shape and the outer edge of the porous portion is defined as a void-forming region in the arbitrary cross section, the first virtual shape being obtained in a case where a homothetically reduced outer shape of the stereostructure first comes into contact with an inner edge of the porous portion, the porous portion located inside a position which is inside from the outer edge of the porous portion by 1/20 of the diameter of the stereostructure, and located in the void-forming region, in the arbitrary cross section has a void ratio per unit area of more than or equal to 15% and less than or equal to 80%.

In one embodiment of the present invention, the porous portion located in the void-forming region in the arbitrary cross section has a void ratio per unit area of more than or equal to 15% and less than or equal to 80%.

In one embodiment of the present invention, the porous portion having a void ratio per unit area of more than 80% exists in at least a portion of a region outside the position which is inside from the outer edge of the porous portion by 1/20 of the diameter of the stereostructure in the arbitrary cross section.

In one embodiment of the present invention, an interval between a second virtual shape and the first virtual shape is less than or equal to 10 μm, the second virtual shape being obtained in a case where the homothetically reduced outer shape of the stereostructure last comes into contact with the inner edge of the porous portion in the arbitrary cross section.

Advantageous Effects of Invention

According to the present invention, a high surface expansion ratio can be obtained while securing a mechanical strength.

DESCRIPTION OF EMBODIMENTS

Hereinafter, a stereostructure in accordance with one embodiment of the present invention will be described with reference to the drawings. In the following description of the embodiment, identical or corresponding parts in the drawings will be designated by the same reference numerals, and the description thereof will not be repeated.

The stereostructure in accordance with one embodiment of the present invention is a stereostructure containing a conductive material. The stereostructure includes a core portion, and a porous portion located around the core portion. The porous portion may be provided by removing a portion of a base material by etching or the like, or may be provided by stacking a material on a base material by evaporation, sintering, or the like.

The shape of the base material may be a wire-like shape including a thread-like shape, a fibrous shape, a round bar-like shape, and the like, or may be a block-like shape including a spherical shape, an ellipsoidal shape, a pellet-like shape, a coin-like shape, and the like. It should be noted that the block-like shape does not include a shape having a thickness of less than or equal to 1 mm, such as a foil-like shape and a sheet-like shape.

Figure 1:
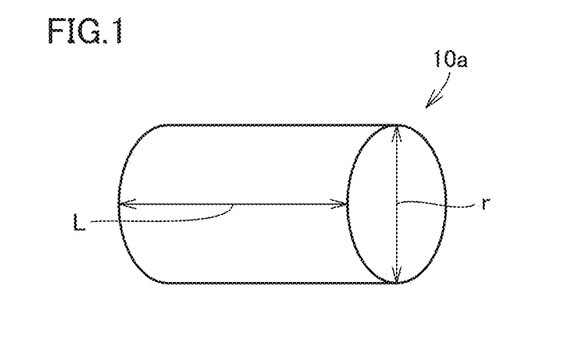
FIG. 1 is a perspective view showing a shape of a base material in a first example.
Figure 2:
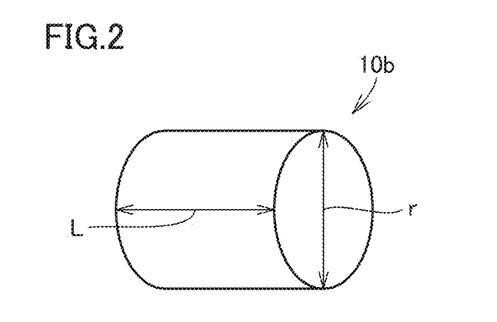
FIG. 2 is a perspective view showing a shape of a base material in a second example.
Figure 3:
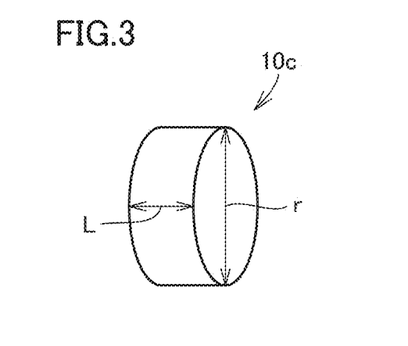
FIG. 3 is a perspective view showing a shape of a base material in a third example.

FIG. 1 is a perspective view showing a shape of a base material in a first example. FIG. 2 is a perspective view showing a shape of a base material in a second example. FIG. 3 is a perspective view showing a shape of a base material in a third example. As shown in FIG. 1, a base material 10a in the first example has a shape with a diameter r of a cross section and a length L, where r<L. As shown in FIG. 2, a base material 10b in the second example has a shape with diameter r of a cross section and length L, where r=L. As shown in FIG. 3, a base material 10c in the third example has a shape with diameter r of a cross section and length L, where r>L.

Although the size relation between diameter r of the cross section and length L of the base material is not particularly limited as described above, when length L of the base material is identical to the length of the stereostructure, the step of cutting the base material according to the length of the stereostructure is eliminated, and thus the steps of manufacturing the stereostructure can be reduced.

When the porous portion is provided by removing a portion of the base material by etching or the like, it is preferable that the base material does not have a non-rounded corner portion in its outer shape. In a case where the base material has a corner portion in its outer shape, when voids are formed in order from an outer peripheral portion toward a central portion of the base material by etching, voids are connected with each other and large voids are formed in the vicinity of the corner portion. In this case, an increase in the surface area of the porous portion is suppressed, and it becomes difficult to obtain a high surface expansion ratio. From the viewpoint of obtaining a high surface expansion ratio, the cross section of the base material preferably has a circular shape.

The material constituting the base material is selected as appropriate according to the application of the stereostructure. When the stereostructure is used as an anode body of an electrolytic capacitor, a dielectric layer is formed on a surface of the porous portion. From the viewpoint of close contact between the porous portion and the dielectric layer, it is preferable to form the dielectric layer using an oxide of a metal component constituting the porous portion. Accordingly, when the porous portion is provided by removing a portion of the base material by etching or the like, the base material is constituted of a valve action metal such as aluminum, niobium, or tantalum.

As described above, the stereostructure may be formed by removing a portion of the base material by etching or the like, or may be formed by stacking a material on the base material by evaporation, sintering, or the like. Further, the stereostructure may be formed by cutting the base material provided with the porous portion. The outer shape of the stereostructure may be a wire-like shape or a block-like shape. The size relation between the diameter of a cross section and the length of the stereostructure is not particularly limited.

Figure 4:
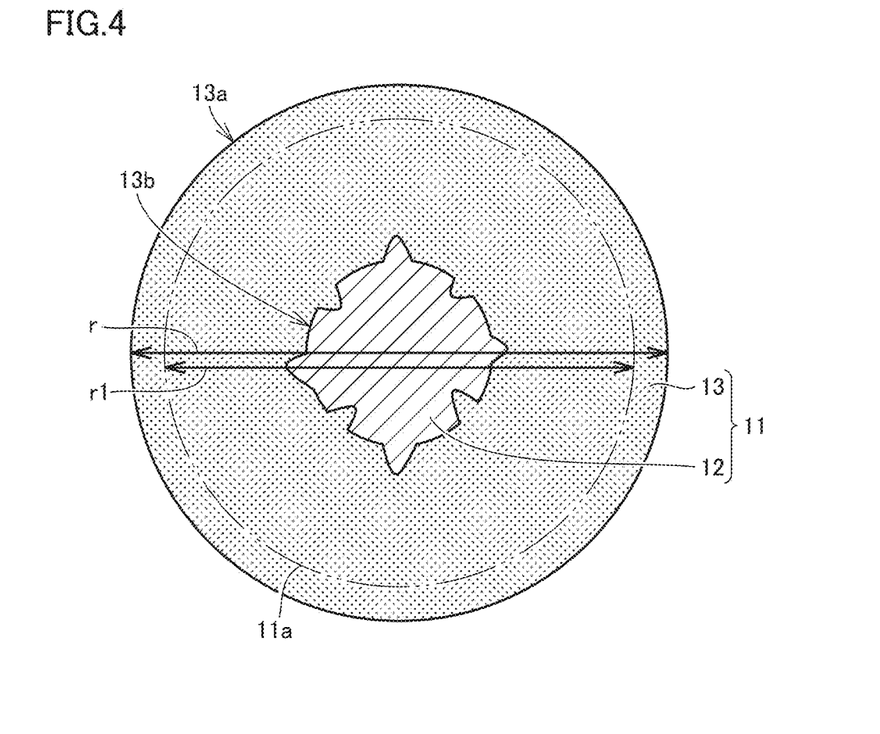
FIG. 4 is a cross sectional view showing a configuration of a stereostructure in accordance with one embodiment of the present invention.

FIG. 4 is a cross sectional view showing a configuration of the stereostructure in accordance with one embodiment of the present invention. As shown in FIG. 4, a stereostructure 11 in accordance with one embodiment of the present invention includes a core portion 12, and a porous portion 13 located around core portion 12. FIG. 4 exaggeratingly shows a state where an inner edge 13b of porous portion 13 has minute radial irregularities along the entire periphery. A cross section of porous portion 13 has diameter r.

In stereostructure 11 in accordance with the present embodiment, porous portion 13 located inside a position 11a which is inside from an outer edge 13a of porous portion 13 by 3/20 of diameter r of stereostructure 11 in an arbitrary cross section has a void ratio per unit area of less than or equal to 80%. When a diameter of porous portion 13 at position 11a is defined as r1, r1=17r/20 is satisfied. Porous portion 13 located inside position 11a more preferably has a void ratio per unit area of less than or equal to 75%.

With the above configuration, porous portion 13 of stereostructure 11 does not have a portion where voids are formed excessively, and thus the mechanical strength of stereostructure 11 can be secured.

Here, a method for manufacturing stereostructure 11 in accordance with the present embodiment will be described. Stereostructure 11 may be formed by removing a portion of the base material by etching or the like, or may be formed by stacking a material on the base material by evaporation, sintering, or the like.

As a method for forming stereostructure 11 by removing a portion of the base material by etching or the like, a method such as alternating current (AC) etching or chemical etching can be used. As an etching solution, for example, an aqueous solution containing hydrochloric acid can be used.

From the viewpoint of uniformly forming voids in porous portion 13, AC etching is more preferable than chemical etching.

When the base material is immersed in an etching bath and voids are formed in order from an outer peripheral portion toward a central portion of stereostructure 11 using common AC etching, the etching solution infiltrating into voids located at an innermost portion of stereostructure 11 is difficult to circulate because the voids have intricate and complicated shapes. Accordingly, the etching solution has a composition and a temperature significantly different from those of the etching solution in the etching bath outside stereostructure 11. As a result, abnormal melting, in which, for example, etching proceeds in a locally concentrated manner and leads to lack of a portion of the base material, is likely to occur. Therefore, it is more likely that, with approaching the central portion of stereostructure 11, more voids are formed, and voids are formed excessively.

In particular, excessive formation of voids is likely to occur from a time point when etching proceeds to the inside of position 11a which is inside from outer edge 13a of porous portion 13 by 3/20 of diameter r of stereostructure 11. The portion where voids are formed excessively has an insufficient mechanical strength, because porous portion 13 becomes brittle and is easily exfoliated. Further, a high surface expansion ratio cannot be obtained, because voids are connected with each other and large voids are formed.

Accordingly, in the method for manufacturing stereostructure 11 in accordance with the present embodiment, when voids are formed in order from the outer peripheral portion toward the central portion of stereostructure 11, a circulating amount of the etching solution in the etching bath is increased as etching proceeds, from the time point when etching proceeds to the inside of position 11a which is inside from outer edge 13a of porous portion 13 by 3/20 of diameter r of stereostructure 11. This can forcibly circulate the etching solution infiltrating into the voids located at the innermost portion of stereostructure 11.

Therefore, the composition and the temperature of the etching solution infiltrating into the voids located at the innermost portion of stereostructure 11 can be brought closer to the composition and the temperature of the etching solution in the etching bath outside stereostructure 11. As a result, porous portion 13 located inside position 11a which is inside from outer edge 13a of porous portion 13 by 3/20 of diameter r of stereostructure 11 can be prevented from having a portion where voids are formed excessively, in which porous portion 13 has a void ratio per unit area of more than 80%.

As a method for forming stereostructure 11 by stacking a material on the base material by evaporation, sintering, or the like, the particle diameter and the density of particles to adhere to the base material by evaporation, sintering, or the like are adjusted as appropriate as stacking of the material on the base material proceeds, such that porous portion 13 has a void ratio per unit area of less than or equal to 80%. In the case of sintering, heating temperature and heating time are also adjusted as appropriate.

Figure 5:
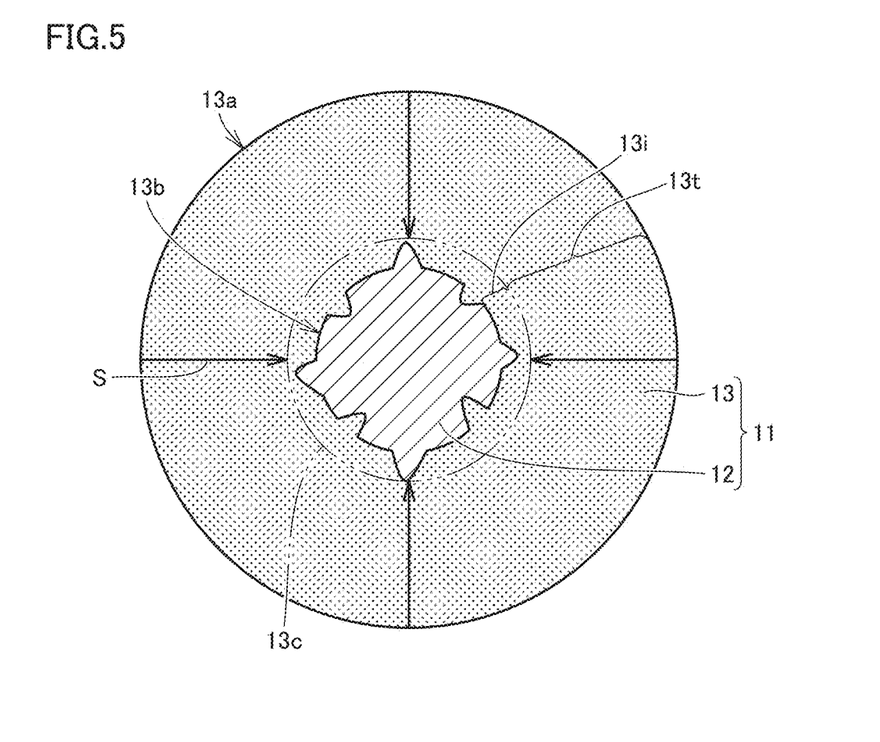
FIG. 5 is a cross sectional view showing a configuration of a stereostructure in accordance with a first modification of one embodiment of the present invention.

Stereostructure 11 in accordance with a first modification of the present embodiment will be described below. FIG. 5 is a cross sectional view showing a configuration of a stereostructure in accordance with a first modification of one embodiment of the present invention. As shown in FIG. 5, a region between a first virtual shape 13c and outer edge 13a of porous portion 13 is defined as a void-forming region 13t in the arbitrary cross section, first virtual shape 13c being obtained in a case where an outer shape of the stereostructure 11 homothetically reduced as indicated by arrows S first comes into contact with inner edge 13b of porous portion 13.

In stereostructure 11 in accordance with the first modification of one embodiment of the present invention, porous portion 13 located in void-forming region 13t has a void ratio per unit area of more than or equal to 15% and less than or equal to 80%, and more preferably more than or equal to 20% and less than or equal to 75%.

Since most of voids in entire porous portion 13 are formed in void-forming region 13t, the mechanical strength and the surface expansion ratio to be obtained of stereostructure 11 are substantially determined by porous portion 13 in void-forming region 13t.

Since porous portion 13 in void-forming region 13t has a void ratio of more than or equal to 15% and less than or equal to 80%, porous portion 13 in void-forming region 13t does not have a portion where voids are formed excessively. In addition, porous portion 13 in a region between inner edge 13b and first virtual shape 13c (hereinafter referred to as a deep layer region 13i) also has a void ratio of less than or equal to 80%. Therefore, the mechanical strength of stereostructure 11 can be secured. Further, a high surface expansion ratio can be obtained, because a void ratio of more than or equal to 15% is secured in porous portion 13 in void-forming region 13t.

Figure 6:
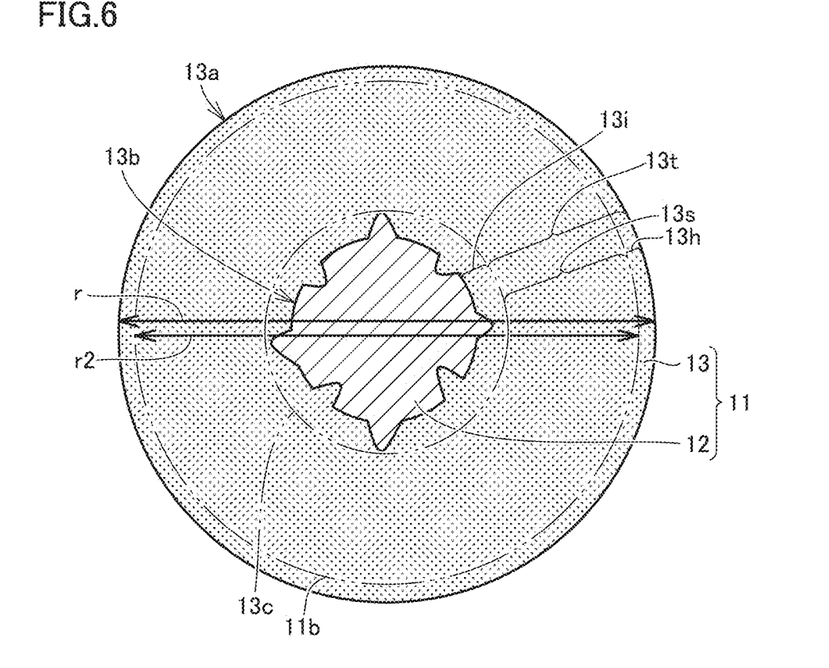
FIG. 6 is a cross sectional view showing a configuration of a stereostructure in accordance with a second modification of one embodiment of the present invention.

Stereostructure 11 in accordance with a second modification of the present embodiment will be described below. FIG. 6 is a cross sectional view showing a configuration of a stereostructure in accordance with a second modification of one embodiment of the present invention. As shown in FIG. 6, in stereostructure 11 in accordance with the second modification of one embodiment of the present invention, porous portion 13 located inside a position 11b which is inside from outer edge 13a of porous portion 13 by 1/20 of the diameter of stereostructure 11, and located in void-forming region 13t, in the arbitrary cross section has a void ratio per unit area of more than or equal to 15% and less than or equal to 80%.

When a diameter of porous portion 13 at position 11b is defined as r2, r2=19r/20 is satisfied. A region located inside position 11b which is inside from outer edge 13a of porous portion 13 by 1/20 of the diameter of stereostructure 11 and located in void-forming region 13t is defined as a main region 13s. More preferably, porous portion 13 in main region 13s has a void ratio per unit area of more than or equal to 20% and less than or equal to 75%.

With the above configuration, porous portion 13 in main region 13s does not have a portion where voids are formed excessively. In addition, porous portion 13 in deep layer region 13i also has a void ratio of less than or equal to 80%. Therefore, the mechanical strength of stereostructure 11 can be secured. Further, a high surface expansion ratio can be obtained, because a void ratio of more than or equal to 15% is secured in porous portion 13 in main region 13s.

A region outside position 11b which is inside from outer edge 13a of porous portion 13 by 1/20 of the diameter of stereostructure 11 is defined as a surface layer region 13h. In stereostructure 11 in accordance with the second modification of one embodiment of the present invention, porous portion 13 having a void ratio per unit area of more than 80% exists in at least a portion of surface layer region 13h. It should be noted that porous portion 13 may have a void ratio per unit area of more than 80% in entire surface layer region 13h.

With the above configuration, stereostructure 11 can be configured such that porous portion 13 in surface layer region 13h has a low rigidity for easy compressive deformation in surface layer region 13h. Thereby, when a bending stress is loaded on stereostructure 11, the bending stress is relieved in surface layer region 13h, and thereby occurrence of a crack or a fracture in porous portion 13 in main region 13s can be suppressed. In addition, the mechanical strength of stereostructure 11 can be secured, because porous portion 13 in main region 13s and deep layer region 13i has a void ratio of less than or equal to 80%. Further, a high surface expansion ratio can be obtained, because a void ratio of more than or equal to 15% is secured in porous portion 13 in main region 13s.

If porous portion 13 has an excessively high void ratio in the vicinity of inner edge 13b, a crack or a fracture may occur in the vicinity of inner edge 13b of porous portion 13, porous portion 13 may rupture from inner edge 13b toward outer edge 13a, and most of porous portion 13 may be exfoliated.

On the other hand, when porous portion 13 has an excessively high void ratio only in surface layer region 13h, even if a crack or a fracture occurs in porous portion 13 in surface layer region 13h, porous portion 13 ruptures from surface layer region 13h toward outer edge 13a, and a portion of porous portion 13 in surface layer region 13h is exfoliated, porous portion 13 has only slight damage. Through the exfoliation of a portion of porous portion 13 in surface layer region 13h, the bending stress is relieved, and thereby occurrence of a crack or a fracture in porous portion 13 in main region 13s can be suppressed.

When porous portion 13 is formed by AC etching as a method for causing porous portion 13 having a void ratio per unit area of more than 80% to exist in at least a portion of surface layer region 13h, AC frequency is decreased only in an initial stage after the AC etching is started. Thereby, voids can be formed excessively only in porous portion 13 located in surface layer region 13h.

When porous portion 13 is formed by stacking a material on the base material by evaporation, sintering, or the like, the particle diameter and the density of particles to be arranged in surface layer region 13h are adjusted as appropriate, such that porous portion 13 having a void ratio per unit area of more than 80% exists in at least a portion of surface layer region 13h. For example, the particle diameter of particles to be arranged in surface layer region 13h is increased, and the density of particles to be arranged in surface layer region 13h is decreased.

Figure 7:
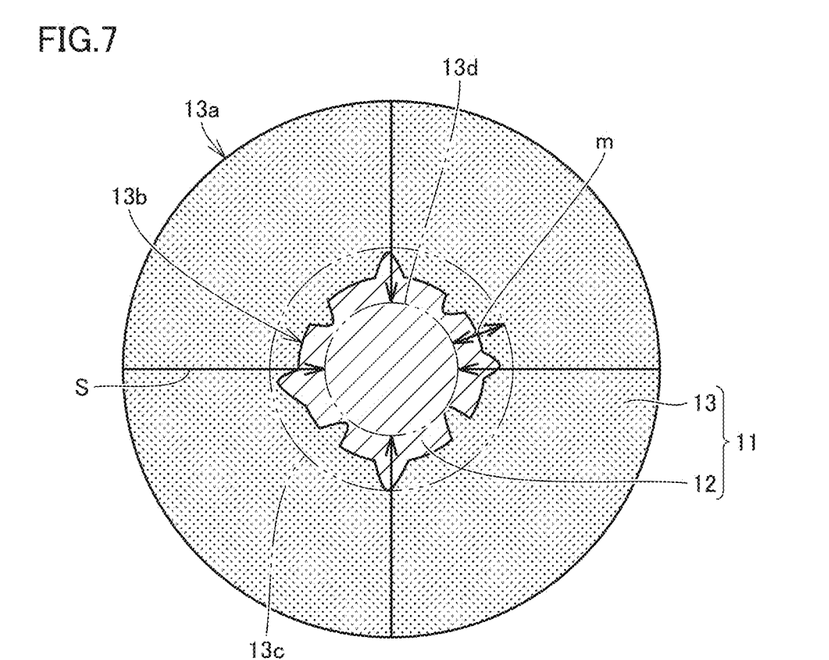
FIG. 7 is a cross sectional view showing a configuration of a stereostructure in accordance with a third modification of one embodiment of the present invention.

Stereostructure 11 in accordance with a third modification of the present embodiment will be described below. FIG. 7 is a cross sectional view showing a configuration of a stereostructure in accordance with a third modification of one embodiment of the present invention. In stereostructure 11 in accordance with the third modification of one embodiment of the present invention, as shown in FIG. 7, an interval m between a second virtual shape 13d and first virtual shape 13c is less than or equal to 10 μm, second virtual shape 13d being obtained in a case where the outer shape of stereostructure 11 homothetically reduced as indicated by arrows S last comes into contact with inner edge 13b of porous portion 13 in the arbitrary cross section. Preferably, interval m is less than or equal to 5 μm.

As shown in FIG. 7, interval m is determined by the size of minute radial irregularities generated along the entire periphery of inner edge 13b of porous portion 13. These minute irregularities are generated, for example, in a case where etching proceeds non-uniformly from the outer peripheral portion toward the central portion of stereostructure 11 when stereostructure 11 is formed by AC etching. In this case, voids are formed in a concentrated manner in a portion where etching proceeds more. As a result, in the vicinity of inner edge 13b of porous portion 13, the void ratio varies among positions, although the positions have the same distance from outer edge 13a of porous portion 13.

When interval m is less than or equal to 10 μm, occurrence of variations in the void ratio of porous portion 13 located in the vicinity of inner edge 13b can be suppressed. As a result, the mechanical strength of stereostructure 11 can be secured, because porous portion 13 in main region 13s and deep layer region 13i has a void ratio of less than or equal to 80%, and excessive formation of voids in porous portion 13 located in the vicinity of inner edge 13b is suppressed. Further, a high surface expansion ratio can be obtained, because a void ratio of more than or equal to 15% is secured in porous portion 13 in main region 13s, and connection of voids and resultant formation of large voids in porous portion 13 located in the vicinity of inner edge 13b are suppressed.

Figure 8:
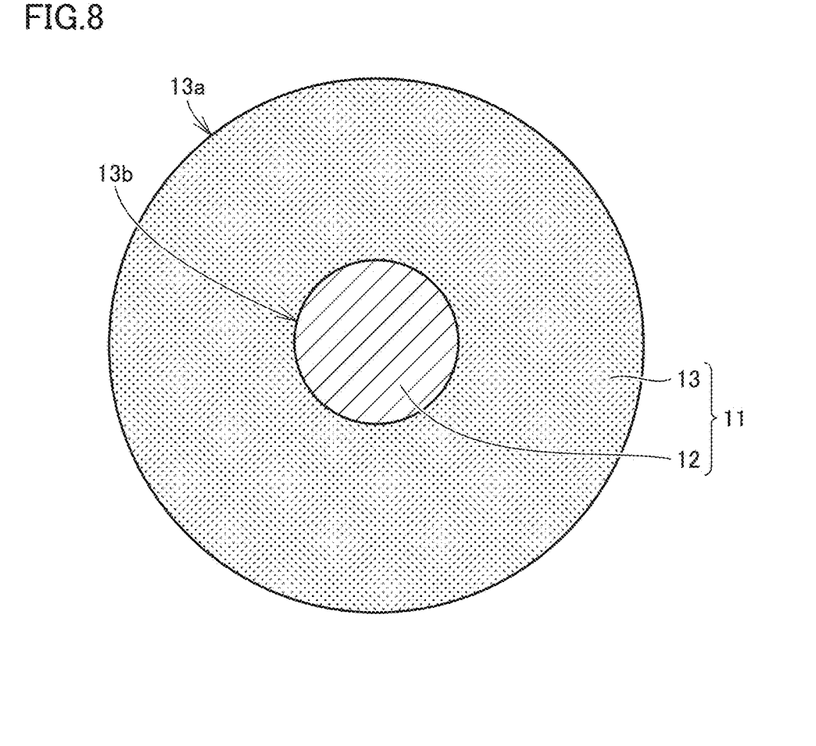
FIG. 8 is a cross sectional view showing a configuration of a stereostructure in accordance with a fourth modification of one embodiment of the present invention.

FIG. 8 is a cross sectional view showing a configuration of a stereostructure in accordance with a fourth modification of one embodiment of the present invention. As shown in FIG. 8, in stereostructure 11, each of outer edge 13a and inner edge 13b of porous portion 13 is circular in an arbitrary cross section. That is, inner edge 13b of porous portion 13 does not have minute radial irregularities. Outer edge 13a and inner edge 13b of porous portion 13 are located concentrically. Accordingly, porous portion 13 has a constant thickness.

With the above configuration, occurrence of variations in the void ratio of porous portion 13 located in the vicinity of inner edge 13b can be further suppressed, when compared with the stereostructure in accordance with the third modification of one embodiment of the present invention. As a result, the mechanical strength of stereostructure 11 can be sufficiently secured by further suppressing excessive formation of voids in porous portion 13 located in the vicinity of inner edge 13b. Further, a sufficiently high surface expansion ratio can be obtained by further suppressing connection of voids and resultant formation of large voids in porous portion 13 located in the vicinity of inner edge 13b.

(Experiment Example)

Hereinafter, an experiment example for verifying properties of stereostructures in accordance with a comparative example and examples will be described below. First, a method for evaluating each property of the stereostructures will be described.

(1) Void Ratio Per Unit Area of Porous Portion

Figure 9:
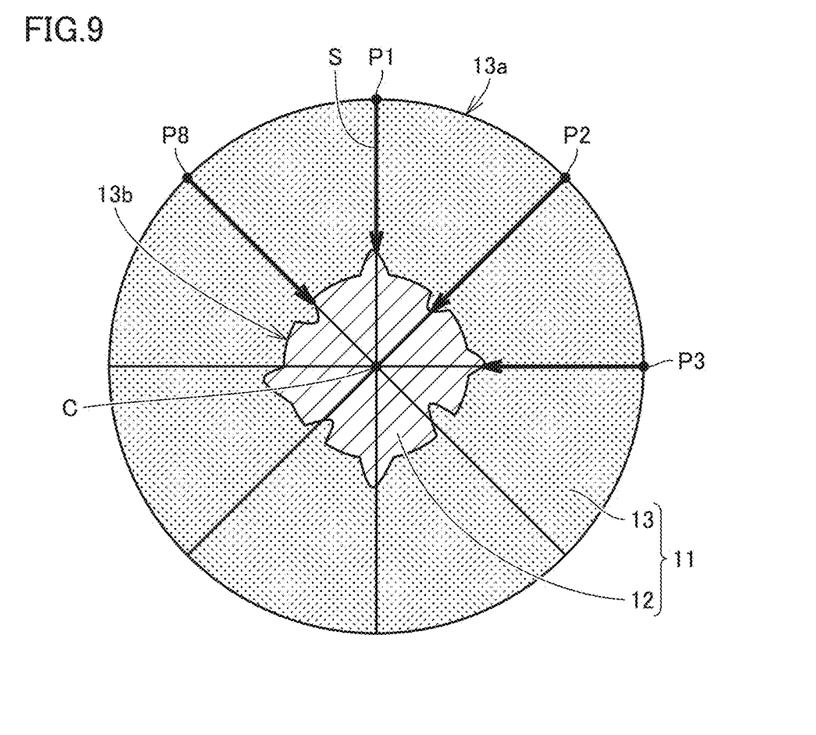
FIG. 9 is a cross sectional view of the stereostructure, for illustrating a method for measuring a void ratio per unit area of a porous portion of the stereostructure.

FIG. 9 is a cross sectional view of the stereostructure, for illustrating a method for measuring the void ratio per unit area of the porous portion of the stereostructure.

As shown in FIG. 9, an image of a cross section of stereostructure 11 taken with a microscope is observed. The difference in color tone in the image is not due to the difference in composition of an observation object, but reflects irregularities of a surface of the observation object. The location with a dark color tone is a location with many voids.

On the taken image, a straight line CP1 which connects an arbitrary point P1 on outer edge 13a of the porous portion 13 and a center C of stereostructure 11 is drawn. Subsequently, an intersection P2 of a straight line obtained by turning straight line CP1 clockwise 45 degrees about center C and outer edge 13a of porous portion 13 is determined, and a straight line CP2 is drawn. Similarly, thereafter, intersections of straight lines each obtained by turning the previous straight line clockwise 45 degrees and outer edge 13a of porous portion 13 are determined, and thus eight straight lines CP1 to CP8 are drawn.

Next, binarization processing is performed on each of straight lines CP1 to CP8, using image analysis software. In the binarized image, the void ratio profile is measured in a 15 µm-wide range with each of straight lines CP1 to CP8 being positioned at the center, from each of points P1 to P8 toward center C as indicated by arrows S. Then, in measurement results at eight locations on straight lines CP1 to CP8, an arithmetic average of void ratios at positions having the same distance from outer edge 13a of porous portion 13 is calculated to determine distribution of the void ratio in the radial direction inside porous portion 13.

(2) Thickness of Void-Forming Region

As shown in FIG. 5, a cross section of stereostructure 11 is taken with a microscope. An interval between first virtual shape 13c and the outer shape of stereostructure 11 is defined as the thickness of the void-forming region.

(3) Surface Expansion Ratio

The capacitance of each of the stereostructure and the base material is measured in an aqueous solution of adipic acid ammonium or an aqueous solution of ammonium borate, using an LCR meter at a measuring frequency of 120 Hz. It should be noted that the aqueous solution used for measuring the surface expansion ratio may be used properly as follows, to suit the situation. When a dielectric layer is formed on the stereostructure by anodization, an aqueous solution used during the anodization is used as the aqueous solution for measuring the surface expansion ratio. When a dielectric layer is formed by a method other than anodization, if the dielectric layer is formed to have a thin thickness, an aqueous solution of adipic acid ammonium is used as the aqueous solution for measuring the surface expansion ratio, and if the dielectric layer is formed to have a thick thickness, an aqueous solution of ammonium borate is used as the aqueous solution for measuring the surface expansion ratio. Then, the ratio of the capacitance of the stereostructure to the capacitance of the base material is determined, and this is defined as the surface expansion ratio.

It should be noted that the magnitude of the surface expansion ratio influences the capacitance of an electrolytic capacitor when the stereostructure is used as an anode body of the electrolytic capacitor, and influences the yield of a catalytic reaction when the stereostructure is used as a catalyst carrier.

(4) Mechanical Strength of Stereostructure

A plurality of stereostructures are arranged and bundled in a lateral line to have a width of about 2 mm, and both ends thereof in a longitudinal direction are bonded and fixed to 1 mm-thick FRP (Fiber Reinforced Plastics) plates using a cellophane tape. A vinyl chloride masking line tape with a width of 3 mm, a thickness of 0.12 mm, and a peeling adhesive strength with respect to a stainless plate of 450 gf/15 mm is affixed to the plurality of stereostructures. When the vinyl chloride masking line tape is affixed to the plurality of stereostructures, a roller of 2 kgf presses the tape against the stereostructures by reciprocating twice over the entire length of the stereostructures.

It should be noted that, when the diameter of the stereostructure is more than 1 mm, the number of stereostructures and the width of the vinyl chloride masking line tape are adjusted such that the ratio between the width of the stereostructures obtained when they are bundled in a lateral line and the width of the vinyl chloride masking line tape to be used is set to substantially 2:3.

Next, an end portion of the FRP plate is fixed to a lower chuck of a tensile tester, and a gripping margin of the vinyl chloride masking line tape is fixed to an upper chuck of the tensile tester. The vinyl chloride masking line tape is peeled off from the stereostructures at a peeling speed of 10 mm/second.

A maximum load loaded by the tensile tester while the vinyl chloride masking line tape is peeled off from the stereostructures is measured. Hereinafter, a value obtained by dividing the maximum load by the number of stereostructures used in the examination will be referred to as a peel strength (gf).

Further, the mechanical strength of the stereostructure is evaluated by visually observing how much the porous portions exfoliated from the stereostructures adhere to the peeled-off vinyl chloride masking line tape.

(5) Bending Deformability of Stereostructure

After the stereostructure is anodized with an applied voltage of 20 V, the stereostructure is bent to follow round bars having different radii of curvature, to determine a maximum radius of curvature of a round bar when the stereostructure is broken. The smaller the maximum radius of curvature is, the higher the bending deformability of the stereostructure is.

In the present experiment example, each property described above was verified using three types of stereostructures in example 1, example 2, and the comparative example.

The stereostructure in accordance with example 1 was fabricated using a cylindrical base material having a diameter of 0.2 mm. The component of the base material was aluminum having a purity of 99.99%. Acid treatment for the purpose of degreasing a surface of the base material was performed on the base material, and then AC etching was performed on the base material in an aqueous solution containing 4.5 wt % of hydrochloric acid, 0.9 wt % of sulfuric acid, and 2.0 wt % of aluminum chloride (hereinafter referred to as an etching solution), by supplying the etching solution toward an axial direction of the base material and thereby circulating the etching solution, such that the void-forming region had a thickness of about 55 µm.

As the conditions for the AC etching, the temperature of the etching solution was set to 35° C., the current density was set to 280 mA/cm², and the current waveform (half wave) was set to a triangular wave. During the AC etching, a circulating amount of the etching solution in an etching bath was set to be increased as etching proceeded. Specifically, the flow velocity at which the etching solution was supplied was set to 40 cm/minute at the beginning of etching, and then the flow velocity of the etching solution was gradually increased to reach 100 cm/minute at the end of etching. After the AC etching was terminated, acid treatment for the purpose of removing chlorine ions was performed on the stereostructure.

The stereostructure in accordance with example 2 was fabricated as in example 1, except that another AC etching was performed at a frequency of 0.5 Hz after the acid treatment for the purpose of degreasing the surface of the base material was performed on the base material and before the AC etching under the same conditions as those of example 1 was performed, and that a circulating amount of the etching solution in an etching bath during the AC etching was maintained at the circulating amount before it was increased in example 1.

The stereostructure in accordance with the comparative example was fabricated as in example 1, except that a circulating amount of the etching solution in an etching bath during the AC etching was maintained at the circulating amount before it was increased in example 1.

TABLE 1

|  | Void ratio in surface layer region | Void ratio in first main region | Void ratio in second main region | Void ratio in deep layer region | Interval m |
|---|---|---|---|---|---|
| Example 1 | 45% to 75% | 45% to 75% | 25% to 70% | 0.1% to 20% | 3 μm |
| Example 2 | 45% to 85% | 45% to 75% | 25% to 70% | 0.1% to 20% | 5 μm |
| Comparative Example | 50% to 95% | 40% to 80% | 65% to 95% | 0.6% to 75% | 2 μm |

TABLE 2

|  | Surface expansion ratio | Mechanical strength of stereostructure | Peel strength | Maximum radius of curvature |
|---|---|---|---|---|
| Example 1 | 108 | Good | 750 | 200 |
| Example 2 | 102 | Good | 730 | 75 |
| Comparative Example | 100 | Insufficient | 100 | 100 |

Table 1 is a table indicating distribution of the void ratio of the porous portion and a measurement result of interval m, in each of the stereostructures in accordance with example 1, example 2, and the comparative example. The distribution of the void ratio of the porous portion indicates a range of the void ratio in each of the surface layer region from outer edge 13a to position 11b of porous portion 13, a first main region from position 11b to position 11a of porous portion 13, a second main area from position 11a of porous portion 13 to first virtual shape 13c, and the deep layer region from first virtual shape 13c to inner edge 13b. It should be noted that a region as a combination of the first main region and the second main region corresponds to the main region. A region as a combination of the surface layer region and the main region corresponds to the void-forming region. A region as a combination of the void-forming region and the deep layer region corresponds to entire porous portion 13.

Table 2 is a table indicating evaluation results of the surface expansion ratio, the mechanical strength of the stereostructure, the peel strength, and the bending deformability of the stereostructure, in each of the stereostructures in accordance with example 1, example 2, and the comparative example.

It should be noted that the surface expansion ratio, the peel strength, and the maximum radius of curvature indicating the bending deformability of the stereostructure, in each of the stereostructures in accordance with example 1 and example 2 are each standardized based on the value of the stereostructure in the comparative example which is set as 100. For the mechanical strength of the stereostructure, the amount of the porous portion adhering to the vinyl chloride masking line tape was visually confirmed, and a case where the amount was small was evaluated as "Good", and a case where the amount was large was evaluated as "Insufficient".

Figure 10:
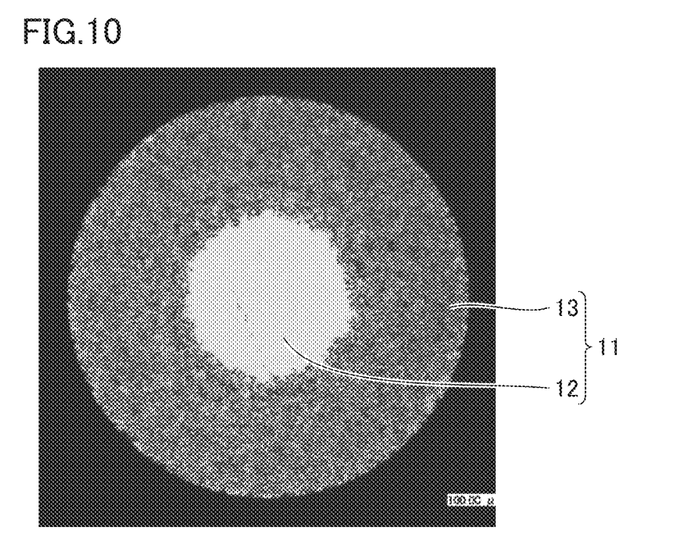
FIG. 10 is a photograph of a cross section of a stereostructure in example 1 taken with a microscope.
Figure 11:
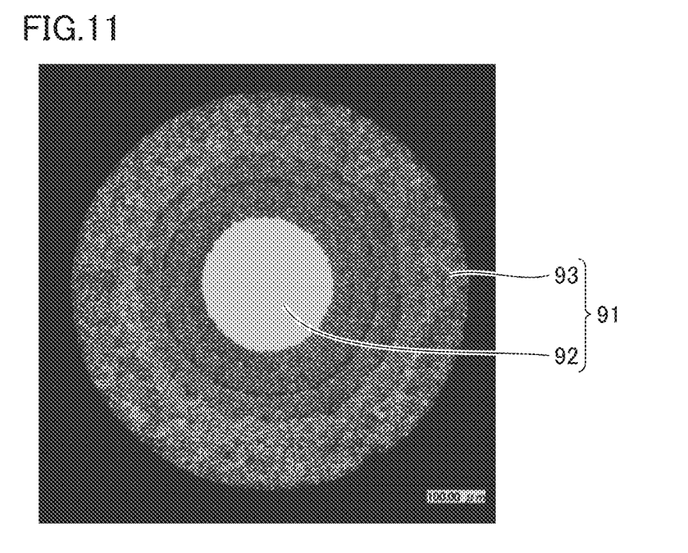
FIG. 11 is a photograph of a cross section of a stereostructure in a comparative example taken with a microscope.
Figure 12:
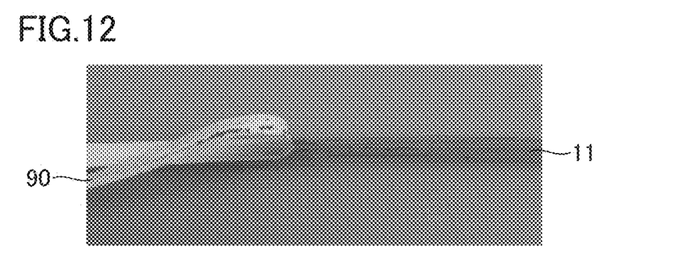
FIG. 12 is a photograph showing a state where a vinyl chloride masking line tape is peeled off from the stereostructure in example 1.
Figure 13:
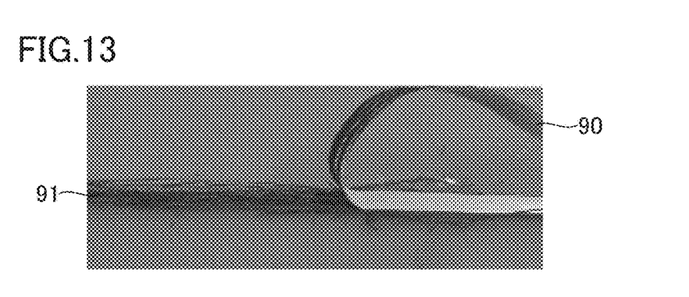
FIG. 13 is a photograph showing a state where a vinyl chloride masking line tape is peeled off from the stereostructure in the comparative example.

FIG. 10 is a photograph of a cross section of the stereostructure in example 1 taken with a microscope. FIG. 11 is a photograph of a cross section of the stereostructure in the comparative example taken with a microscope. FIG. 12 is a photograph showing a state where the vinyl chloride masking line tape is peeled off from the stereostructure in example 1. FIG. 13 is a photograph showing a state where the vinyl chloride masking line tape is peeled off from the stereostructure in the comparative example.

As indicated in Table 1, in the stereostructure in example 1, the void ratio in the entire porous portion was less than or equal to 80%, and interval m was 3 μm. In the stereostructure in example 2, the void ratio of the porous portion in the surface layer region was more than 80%, and interval m was 5 μm. In the stereostructure in the comparative example, the void ratio of the porous portion in the surface layer region and the second main region was more than 80%, and interval m was 2 μm.

As shown in FIG. 10, in stereostructure 11 in example 1, the color tone in porous portion 13 was substantially constant from the outer edge toward the inner edge. In stereostructure 11 in example 1, excessive formation of voids in the vicinity of the inner edge of porous portion 13 was not observed. Minute radial irregularities were observed along the entire periphery of the inner edge of porous portion 13.

As shown in FIG. 11, in a stereostructure 91 in the comparative example, the color tone in a porous portion 93 became darker from the outer edge toward the inner edge, and there was a large difference in color tone at a boundary between a core portion 92 and porous portion 93. In stereostructure 91 in the comparative example, excessive formation of voids in the vicinity of the inner edge of porous portion 93 was able to be confirmed.

As indicated in Table 2, in the stereostructure in example 1, the surface expansion ratio was 108, the mechanical strength of the stereostructure was evaluated as Good, the peel strength was 750, and the maximum radius of curvature of the stereostructure was 200. In the stereostructure in example 2, the surface expansion ratio was 102, mechanical strength of the stereostructure was evaluated as Good, the peel strength was 730, and the maximum radius of curvature was 75. In the stereostructure in the comparative example, the surface expansion ratio was 100, the mechanical strength of the stereostructure was evaluated as Insufficient, the peel strength was 100, and the maximum radius of curvature was 100.

As shown in FIG. 12, in the stereostructure in example 1, the amount of the porous portion adhering to the vinyl chloride masking line tape was small. As shown in FIG. 13, in the stereostructure in the comparative example, the amount of the porous portion adhering to the vinyl chloride masking line tape was large.

From the experimental results described above, it was possible to confirm that a high surface expansion ratio can be obtained while securing the mechanical strength of stereostructure 11, because porous portion 13 located inside position 11a which is inside from outer edge 13a of porous portion 13 by 3/20 of diameter r of stereostructure 11 has a void ratio per unit area of less than or equal to 80%.

When example 1 is compared with example 2, the maximum radius of curvature in example 2 was smaller than that in Example 1. That is, the bending deformability of the stereostructure in example 2 was higher than that in example 1. On the other hand, example 1 and example 2 had an equal mechanical strength of the stereostructure.

Therefore, it was possible to confirm that the bending deformability of the stereostructure can be increased while securing the mechanical strength of the stereostructure, by increasing the void ratio in the region outside position 11b which is inside from outer edge 13a of porous portion 13 by 1/20 of the diameter of stereostructure 11 to more than 80%.

Figure 14:
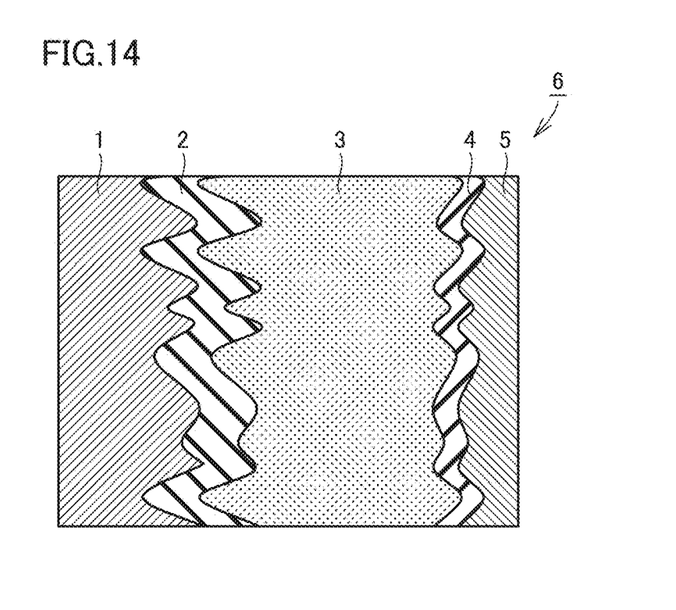
FIG. 14 is a partial cross sectional view showing a configuration of an electrolytic capacitor including the stereostructure in accordance with one embodiment of the present invention as an anode body.

An example of an electrolytic capacitor including the stereostructure in accordance with the present embodiment as an anode body will be described below. FIG. 14 is a partial cross sectional view showing a configuration of an electrolytic capacitor including the stereostructure in accordance with one embodiment of the present invention as an anode body. It should be noted that FIG. 14 does not show a separator.

As shown in FIG. 14, an electrolytic capacitor 6 includes an anode body 1, a dielectric 2, an electrolyte 3, a dielectric 4, and a cathode body 5. As a method for forming dielectric 2 on a surface of the stereostructure serving as anode body 1, a method of anodizing the stereostructure in an aqueous solution of ammonium borate, ammonium phosphate, adipic acid ammonium, or the like can be used.

Electrolyte 3 may be either of an electrolytic solution and a solid electrolyte. As the electrolytic solution, an electrolytic solution using polyethylene glycol γ-butyrolactone, or the like as a solvent can be used. As the solid electrolyte, a solid electrolyte including a conductive polymer such as polypyrrole, polythiophene, polyfuran, or polyaniline can be used.

As cathode body 5, aluminum foil can be used. When electrolyte 3 is a solid electrolyte, a stacked body of a carbon layer and a silver paste layer or the like can also be used.

The electrolytic capacitor further includes a separator inserted between the anode body and the cathode body, an anode terminal connected to the anode body, a cathode terminal connected to the cathode body, an aluminum case, a sealing rubber, and the like. For these components, those used for a conventional electrolytic capacitor can be used.

The capacitance of electrolytic capacitor 6 is equal to a combined capacitance of a capacitor including anode body 1, dielectric 2, and electrolyte 3 and a capacitor including electrolyte 3, dielectric 4, and cathode body 5 which are connected in series. Since cathode body 5 generally has a capacitance sufficiently higher than that of anode body 1, the capacitance of electrolytic capacitor 6 is significantly influenced by the value of the capacitance of the capacitor including anode body 1, dielectric 2, and electrolyte 3. Accordingly, the surface area of anode body 1, more accurately, the surface area of anode body 1 after dielectric 2 is formed on the surface thereof, has a significant influence on the capacitance of electrolytic capacitor 6. That is, an electrolytic capacitor having a high capacitance can be manufactured by using the stereostructure in accordance with the present embodiment having a high surface expansion ratio while securing a mechanical strength.

It should be noted that not only capacitance but also low leak current are important as properties required for electrolytic capacitor 6. Since dielectric 2 has a defect and is not a perfect insulator, when a direct current voltage is applied to electrolytic capacitor 6, a very small leak current may be generated and have an adverse effect on a circuit to which electrolytic capacitor 6 is connected. In particular, when a cross section of the stereostructure occupies a large area in the surface area of the stereostructure, the leak current has a significant influence.

For example, when electrolytic capacitor 6 is used as a noise filter such as a low pass filter, electrolytic capacitor 6 is arranged in parallel to a signal line, and electrolytic capacitor 6 is connected with the ground. Thereby, a signal having a high frequency which may cause a noise can be removed from the signal line.

$$|Z|=1/(2\pi fC) \qquad \text{(equation 1)}$$

(Z: impedance, f: frequency, C: capacitance)

Equation 1 is an equation indicating the relation among impedance, frequency, and capacitance when the electrolytic capacitor is used as a noise filter. It should be noted that an inductor is not considered in equation 1. Since the impedance of electrolytic capacitor 6 is decreased with an increase in frequency as can be seen from equation 1, a signal having a high frequency is likely to be removed from the signal line and flow into electrolytic capacitor 6.

However, the leak current flows from electrolytic capacitor 6, as described above. When the dielectric formed on the surface of the anode body is subjected to dielectric breakdown due to the leak current, the effect as a noise filter such as a low pass filter is deteriorated. Accordingly, it is necessary to reduce the leak current.

Therefore, by reducing the area occupied by the cross section of the stereostructure in the surface area of the stereostructure, the leak current of electrolytic capacitor 6 can be suppressed low, and the performance of electrolytic capacitor 6 as a noise filter can be improved.

An example of a catalyst body including the stereostructure in accordance with the present embodiment as a catalyst carrier will be described below. The catalyst body can be used, for example, for a precise chemical reaction system like a microreactor.

As a method for manufacturing the catalyst carrier, the stereostructure is anodized in an acid electrolytic solution. Preferably, hydration treatment is performed after the anodization, and baking treatment is further performed at a temperature of more than or equal to 300° C. and less than or equal to 550° C.

A metal having a catalytic activity to be carried by the stereostructure is not particularly limited, and a metal, an alloy, or a metal oxide having a catalytic activity, such as a platinum-based metal, can be used.

As a method for causing the stereostructure to carry the metal having a catalytic activity, for example, an impregnation method in which the stereostructure is immersed in an aqueous solution containing ions of the metal having a catalytic activity can be used. Further, baking treatment may be performed to affix the metal having a catalytic activity to the stereostructure.

In order to increase the yield of the catalyst body, a key factor is that how much the metal having a catalytic activity can be carried by the catalyst carrier. That is, a high yield can be obtained in the catalytic reaction by using the stereostructure in accordance with the present embodiment having a high surface expansion ratio while securing a mechanical strength.

The stereostructure in accordance with the present embodiment can be used for other applications for which a high surface expansion ratio is required while securing a mechanical strength.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

1: anode body; 2, 4: dielectric; 3: electrolyte; 5: cathode body; 6: electrolytic capacitor; 10a, 10b, 10c: base material; 11, 91: stereostructure; 11a, 11b: position; 12, 92: core portion; 13, 93: porous portion; 13a: outer edge; 13b: inner edge; 13c: first virtual shape; 13d: second virtual shape; 13h: surface layer region; 13i: deep layer region; 13s: main region; 13t: void-forming region.

The invention claimed is:

1. A stereostructure containing a conductive material, comprising:
a core portion; and
a porous portion located around the core portion, wherein:
the conductive material is constituted of aluminum;
the porous portion located inside a position which is inside from an outer edge of the porous portion by 3/20 of a diameter of the stereostructure in an arbitrary cross section of the stereostructure has a void ratio per unit area of less than or equal to 80%;
an inner edge of the porous portion has minute radial irregularities along an entire periphery; and
an outer shape of the stereostructure is at least one of
a wire-like shape, and
a block-like shape not including a foil-like shape having a thickness of less than or equal to 1 mm.

2. The stereostructure according to claim 1, wherein when a region between a first virtual shape and the outer edge of the porous portion is defined as a void-forming region in the arbitrary cross section, the first virtual shape being obtained in a case where a homothetically reduced outer shape of the stereostructure first comes into contact with the inner edge of the porous portion, the porous portion located inside a position which is inside from the outer edge of the porous portion by 1/20 of the diameter of the stereostructure, and located in the void-forming region, in the arbitrary cross section has a void ratio per unit area of more than or equal to 15% and less than or equal to 80%.

3. The stereostructure according to claim 2, wherein the porous portion located in the void-forming region in the arbitrary cross section has a void ratio per unit area of more than or equal to 15% and less than or equal to 80%.

4. The stereostructure according to claim 2, wherein the porous portion having a void ratio per unit area of more than 80% exists in at least a portion of a region outside the position which is inside from the outer edge of the porous portion by 1/20 of the diameter of the stereostructure in the arbitrary cross section.

5. The stereostructure according to claim 2, wherein an interval between a second virtual shape and the first virtual shape is less than or equal to 10 μm, the second virtual shape being obtained in a case where the homothetically reduced outer shape of the stereostructure last comes into contact with the inner edge of the porous portion in the arbitrary cross section.

6. The stereostructure according to claim 3, wherein an interval between a second virtual shape and the first virtual shape is less than or equal to 10 μm, the second virtual shape being obtained in a case where the homothetically reduced outer shape of the stereostructure last comes into contact with the inner edge of the porous portion in the arbitrary cross section.

7. The stereostructure according to claim 4, wherein an interval between a second virtual shape and the first virtual shape is less than or equal to 10 μm, the second virtual shape being obtained in a case where the homothetically reduced outer shape of the stereostructure last comes into contact with the inner edge of the porous portion in the arbitrary cross section.

* * * * *